June 29, 1965 G. L. LANG 3,192,503
AIRCRAFT TAKE-OFF FORECAST SYSTEM
Filed Feb. 27, 1958 4 Sheets-Sheet 2

INVENTOR.
GREGOR L. LANG
BY
Raymond A. Paquin
ATTORNEY.

June 29, 1965 G. L. LANG 3,192,503
AIRCRAFT TAKE-OFF FORECAST SYSTEM
Filed Feb. 27, 1958 4 Sheets-Sheet 3

INVENTOR.
GREGOR L. LANG
BY
Raymond A. Paquin
ATTORNEY.

INVENTOR.
GREGOR L. LANG

United States Patent Office 3,192,503
Patented June 29, 1965

3,192,503
AIRCRAFT TAKE-OFF FORECAST SYSTEM
Gregor L. Lang, East St., Suffield, Conn.
Filed Feb. 27, 1958, Ser. No. 718,050
14 Claims. (Cl. 340—27)

This invention relates to aircraft flight instruments and more particularly relates to indicating devices for denoting to the pilot of an aircraft during take-off roll, the existence of any condition capable of preventing the aircraft from becoming safely airborne within the runway length available for take-off.

Although the invention is susceptible to use with various types of propeller driven aircraft, it is particularly applicable to aircraft of the reaction propelled types, such as turbo jet propelled types, and for convenience herein is described as applied thereto.

It is well known that aircraft of the jet propelled type do not ordinarily attain during take-off roll the same rapid acceleration rates as their propeller driven counterparts. This is due mainly to the lower thrust to mass ratio which is common to the jet propelled types. One result of this has been a major increase in the length of ground run required by the jet propelled craft for attaining the air speed required to become safely airborne.

As jet aircraft have become progressively larger, faster and heavier, the requirement for airport runways of greater length has been progressive in order to provide for the jet aircraft the margin of take-off safety felt by the various operating and planning authorities to be necessary.

Airports constructed for the earlier propeller driven aircraft have become unuseable or marginal and hazardous, except when runway extensions have been constructed to accommodate the jet craft.

Many serious accidents have occurred in which jet aircraft believed capable of safe take-off have overrun the paved runway at high speed while still on the wheels, and have been destroyed or damaged in the rough unpaved ground beyond the runway's end.

Past efforts to minimize the take-off hazard, have included the construction of very long and costly runways and have further included the development of a number of safety techniques and pretake-off preparations which devolve upon the pilot, thus adding to his already heavy burden of tasks and responsibility. Some runways intended for jet aircraft use are provided with large signs having painted numbers spaced at 1000 ft. intervals along the runway, with the numbers in decreasing sequence as the take-off run progresses. Thus is indicated to the pilot the runway length remaining at any given point in the take-off roll.

The effective use of such ground markers involves a preflight calculation which requires accurate advance knowledge of load or gross weight, wind velocity, pressure altitude or air density, safe lift-off air speed, and specific performance data generally obtained from a curve or graph pertaining to the particular aircraft involved. Turbo jet thrust meters have been developed which provide approximate indications of the thrust force being developed by the turbo jet engines, and are of some assistance in assuring safe take-off.

In practice it is common for the pilot to precalculate a mid-runway check point where, for instance, he determines in advance for a safe take-off that at the 4000 ft. marker the air speed indicator must show 75% of the calculated lift-off air speed. Having initiated the take-off roll, he compares the rising value of air speed with the markers as they pass, and having made good the 75% value at the 4000 ft. marker above described, he continues the roll and is said to be "committed." However, in the case of failure of the craft to make good the 75% air speed value, prompt and precise action is required within a time period, often as short as three seconds. Jet power is cut and brakes violently applied in order to bring the craft to a safe stop within the remaining length of runway. This is often described as an "aborted" or "refused" take-off, and such action must be taken at or before the "point of last refusal." This is a position along the runway, varying with aircraft speed, mass, brake effectiveness, runway surface or traction condition and other variables which must be taken into account if destruction of the aircraft is to be avoided and a safe stop effected. It is often described as "V1."

The above described precautionary methods have proved only partially effective. Take-off accidents continue to occur. Relatively few runways of safe and fully adequate length are available, and relatively few runways used by jet aircraft are equipped with distance markers or signs. The most exact take-off plan precomputed by the pilot may be rendered meaningless by the unsuspected presence of such speed inhibiting factors as an inadvertent overload, a soft tire, a dragging brake or an up-hill runway. Many accidents have been caused by the unsuspected presence of these or other variable factors, which occurring either singly or in combination, have conspired to render the aircraft incapable of take-off within the available length of runway, or incapable of a safe climbing rate after leaving the ground.

The problem is that of providing instrument means of relieving the pilot of the mental burden above described; of providing accurate and early verification of the validity of his pretake-off calculations; of providing early and accurately computed evidence that the craft is in fact capable of becoming airborne within the intended roll distance, and of providing a warning of inability to become airborne sufficiently early in the roll so that a nonviolent stop may be effected, and of providing an advance indication of the attainable rate of climb after take-off.

The relatively large number of environmental and variable factors or conditions which collectively determine the ability of a jet aircraft to become airborne, has caused previous investigators to assume that a computing instrument system capable of solving the take-off equation would of necessity be extremely complex.

The present invention makes use of the discovered fact that segregation of these variables into four groups based upon cause and effect, results in the virtual elimination of the largest group, drag effects, as a factor in the required computation.

The more important variables effective during early take-off roll are:

A. Thrust or driving force.
B. Gross weight or mass of aircraft.
C. (1) Runway length available for take-off.
    (2) Air density or pressure altitude which includes temperature effects.
    (3) Vector wind, or effective wind in line of take-off.
D. Drag effects.
    (1) Runway grade or slope.
    (2) Type of runway surface, and wet or dry condition.
    (3) Runway surface, ice or snow condition.
    (4) Rolling resistance of bearings and wheel parts (normal).
    (5) Rolling resistance of loaded tires (normal).
    (6) Tire drag, effect of low temperature on rubber pliability.
    (7) Bearing drag at low temperatures.
    (8) Possible dragging brakes or other wheel parts.

(9) Added tire drag due to "pouting" overload or under-inflation.

(10) Tire drag due to wheel alignment, toe-in, toe-out, side skid, etc.

The equation for horizontal acceleration is $$\text{accel. G, ft./sec.}^2 = \frac{F}{W} \times 32.16$$

or $$\text{accel. G} = \frac{F}{W}$$

where in our case, $F$=force or net thrust and $W$ is the gross weight of the loaded aircraft.

The discovery enabling this invention is that the summation of all of the drag effects D represent during the early part of the take-off roll, simply a relatively fixed value of resistance to forward motion which is effective only in reducing the total value of thrust T1 to a reduced value which may be expressed as simply T2 net thrust=$T1-D$, which is the net thrust available to impart forward motion to the weight W.

The equation for acceleration now becomes $$\text{accel. G ft./sec.}^2 = \frac{T1-D}{W} \times 32.16 = \frac{T2}{W} \times 32.16$$

This brings forth the significant fact that for the accelerating aircraft, where instrumentation for acceleration is applied, all of the values listed above under A, B, and D, automatically disappear as values requiring separate evaluation or instrumentation. The subtraction of the summed values of D from the thrust value T1 is accomplished in a physical sense within the aircraft structure.

The derivation of the value of G alone may be accomplished in a variety of ways, and of course permits a ready prediction of either the time or distance required to reach velocity V, by standard mathematical or computational means.

It will now be seen that only variables remaining to be computed or combined with acceleration G by the instrument are those listed under C above, which may be described as environmental variables.

It is noted that in the present state of the art the individual values or quantities listed under A, B, and D, are those which would be most difficult, if not impossible of individual evaluation, yet all are adequately and accurately evaluated in a collective sense, under the one resultant value of G or acceleration.

The three environmental values listed under C are readily ascertainable for computing purposes.

The instrumentation reduces to the derivation of a signal proportional to the attained rate of acceleration, which is presented to the pilot by a display instrument or other means which compares this signal value with a computed required acceleration value obtained by simple analogue means from the three environmental variables, runway length, effective wind, and air density. This comparison is available to the pilot immediately after the initiation of the take-off roll. The resultant indication is mathematically rigorous in that all known variables are taken into account. The liability of error is vanishingly small, since only two values, runway length and wind velocity, are introduced manually as preflight adjustments. The compared signals provide a ready and positive indication of the advisability of either continuing or refusing take-off and may in addition be utilized to actuate auxiliary alarm equipment, or to initiate automatic corrective measures if so desired.

The principal objects of the present invention are; to provide an instrument and warning system which will greatly enhance the safety of operation of aircraft during take-off; to provide instrument means of substantially eliminating take-off accidents caused by overrunning of the runway; to provide means of safely permitting operation of aircraft from runways of shorter length than would otherwise be possible; to provide means enabling safe take-off of aircraft with greater loads and gross weight than would otherwise be allowable; to permit safe operation of aircraft under conditions as described above, from "strange runways" having unknown grade or slope conditions; to permit safe operation of aircraft from runways not equipped with signs, distance markers or other ground aids; to provide a visual or other type indicator which early in the take-off run provides the pilot with an accurate take-off safety forecast and which serves to verify the accuracy of any pretake-off calculations, and which further serves to immediately indicate the presence of any changed or unsuspected physical condition capable of lengthening the take-off run; to provide an indicator which throughout the take-off run provides continuing assurance or evidence of the adequacy of the acceleration rate or conversely indicates immediately the onset of any changed condition which impairs the acceleration rate; and to provide a warning instrument which is fully operative sufficiently early in the take-off roll to enable the pilot to make a "stop" or "go" decision before reaching a high forward velocity.

Secondary objects include the provision of an instrument which is sensitive to either or both acceleration and velocity; the provision of an instrument which denotes the value of acceleration and is additionally provided with threshold sensing means whereby auxiliary alarm methods are employed to call attention to any abrupt change in acceleration; the provision of an instrument system which may be optionally employed to denote either acceleration during take-off or deceleration to aid in securing maximum braking effectiveness during ground roll after landing; the provision of an acleration measuring instrument which by a simple adjustment may be utilized as a velocity indicator, as for instance, when taxiing, to indicate ground speed—m.p.h.

These and other objects of the invention will become more apparent from the following description and from the accompanying drawings describing various embodiments of the present invention.

Figure 1:
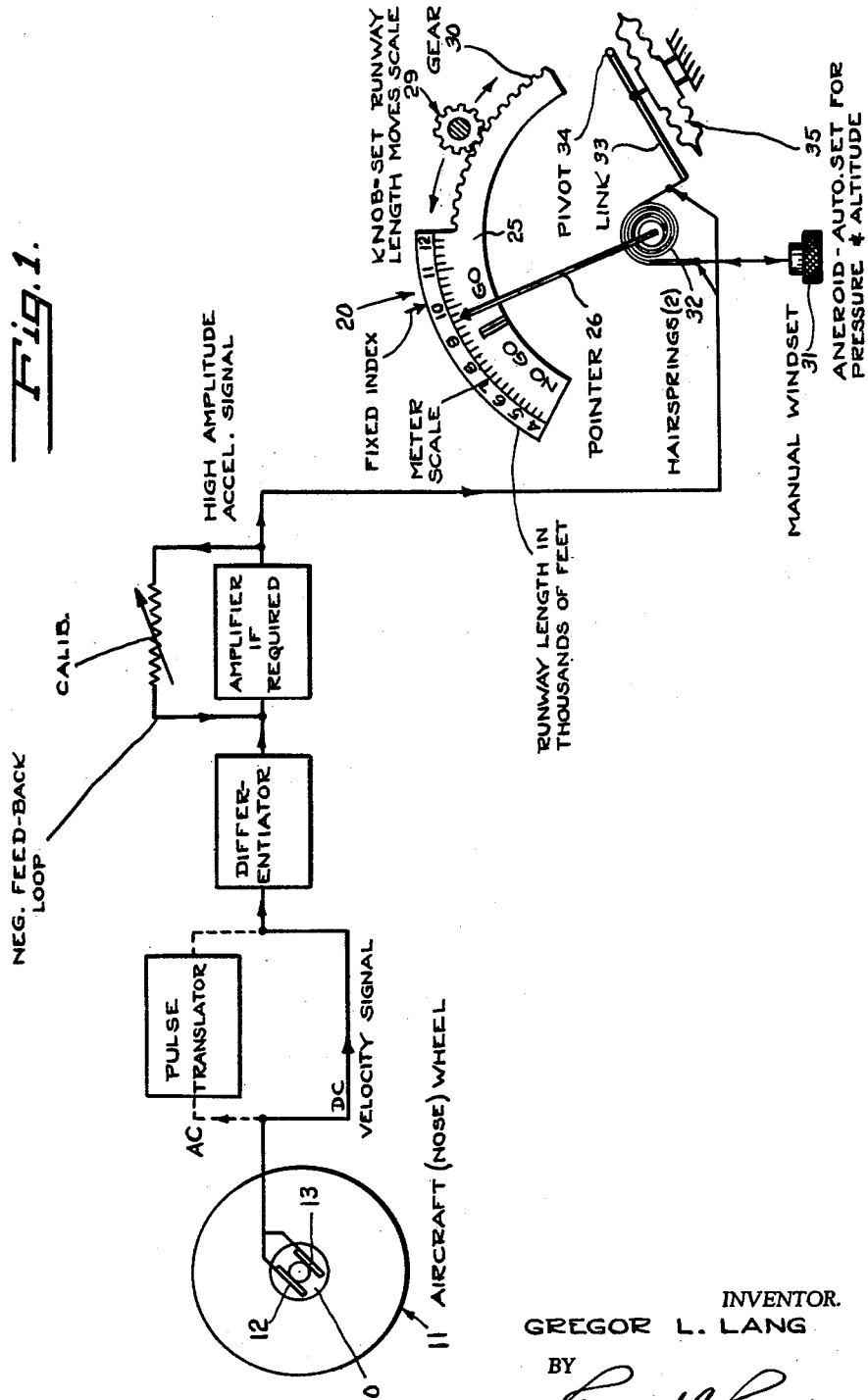
FIG. 1 is a schematic view illustrating one form of the invention.

Generally speaking, the invention comprises accelerometer means capable of producing signals which vary as a function of the time rate of gain of velocity of the aircraft along the ground. The signals may be derived from a wheel rate generator attached to one of the landing gear wheel in such manner as to produce a voltage varying in value with the rotational rate of the wheel, and consequently varying in value with the velocity of the aircraft along the ground. These velocity signals are converted to acceleration signals through the employment of a resistance-capacitance differentiating network. The signal, now representing a function of the time rate of change of velocity, is amplified as needed by a stable balanced type direct current amplifier which, shown as a vacuum tube amplifier, preferably has the output meter so connected as to respond to cathode current unbalance. Gain control means are provided to permit adjusting the sensitivity of the overall system to the needs of the specific aircraft type.

The acceleration indications are displayed by the pointer of the meter against a scale which is divided into two sectors having marks such as "GO" and "NO GO." This scale is laterally movable along the pointer arc and is manually positioned by an external control having an adjusting scale calibrated to represent "runway length feet." The adjustment for wind velocity requires another manual control which functions to displace the pointer slightly in a clockwise direction for increasing wind values. This bias may be applied through a hair spring or by means of an electrical unbalance of the amplifier cathode currents by means of a calibrated potentiometer. The remaining variable, air density, may be introduced as an additional pointer bias, applied manually or by means of an aneroid pressure unit, acting either through a hair spring or through a potentiometer to displace the pointer in a counter-clockwise direction for a decrease in barometric pressure.

The instrument system thus provides for the pilot an indication of the rate of acceleration being attained, in comparison with the computed or "mathematical" value required for safe take-off. This indication becomes effective immediately after the start of take-off roll and remains effective until the wheels "break ground," particularly when the auxiliary acceleration drop-off sensing circuit is utilized.

The acceleration drop-off warning auxiliary circuit provides a means of detecting and quickly calling to the pilot's attention, any abrupt partial loss or drop-off of acceleration rate below the value previously established and below the value normal to the particular craft. This is a continuing function of the instrument system, effective until the wheels break ground or later, if an inertial type accelerometer were employed. Its purpose is to provide throughout the take-off roll an indication of the onset of such conditions as the sudden full or partial loss of thrust of one engine in a multi-engine installation; the sudden loss of pressure in a tire, or the sudden partial seizure of a wheel bearing.

This circuit is basically an additional differentiator circuit so connected as to sense the rate at which acceleration may be varying. Its output may actuate either a calibrated meter or indicator or it may be arranged to actuate a threshold or limit relay, which in turn actuates an alarm device such as a signal light or horn.

Referring more particularly to the drawings wherein similar reference characters designate corresponding parts throughout, the devices shown for the purpose of illustrating the invention are as follows:

In FIG. 1 there is shown schematically a form of the invention which is believed apparent from the following description.

Figure 2:
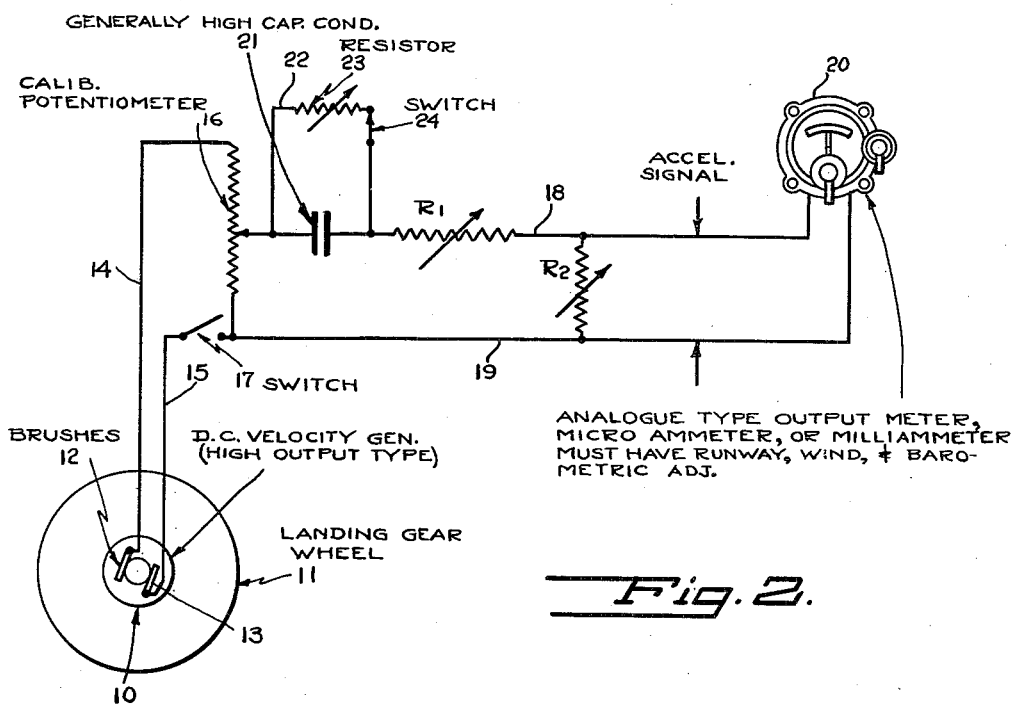
FIG. 2 is a diagrammatic view of a simplified circuit embodying the principles of the invention.

In the form of the apparatus shown in FIG. 2 there is provided a D.C. velocity generator of high output type, that is, a speed sensitive generator which is adapted to provide a signal varying according to the velocity of the aircraft along the runway. This generator designated generally at 10 is preferably provided on a landing gear wheel 11 of the aircraft and the generator 10 has the brushes or the like 12 and 13 for the generator 10, which is on the wheel 11 and preferably on the axle of the wheel, whereby rotation of the wheel will operate the generator.

The generator brushes 12 and 13 are connected by the lines 14 and 15 respectively to the calibrating potentiometer 16, which is of the voltage dividing type and is connected across to the output of generator 10.

The switch 17 is a safety cut-off switch adapted to be opened during flight to prevent damage to the meter at the instant of touch down when landing the aircraft.

The velocity voltage appearing at the output of adjusting potentiometer 16 is transmitted to output indicator 20 by leads 18 and 19, after first being converted into an acceleration voltage by the action of the differentiating network. The differentiating network consists of capacitor 21 and two resistors R1 and R2. The use of variable resistors R1 and R2 is desirable, since adjustment or manipulation of these units permits the twofold result of enabling variation of the R-C time constant of the differentiating network, and of adjusting the relative response of indicating meter 20, principally by adjustment of the meter shunting resistor R2.

The bypass circuit 22 including resistor 23 and switch 24, is intended to render the differentiating capacitor 21 inoperative when switch 24 is closed. The indicator 20 is thus made responsive to velocity alone, as for instance to indicate rolling speed, miles per hour when taxiing, either before take-off or after landing. Indicator 20 would be provided with a supplementary scale properly marked or calibrated for this purpose. Variable resistance 23 enables proper adjustment of this velocity indicating system without disturbing the other adjustments pertaining to the acceleration function.

The meter 20, which is the same as the meter shown schematically in FIG. 1, has the scale 25 having sections bearing "NO GO" and "GO" indications to indicate whether or not the aircraft will become safely airborne on the available runway.

The meter 20 has the pointer 26 adapted to cooperate with the scale 25, which scale is adapted to be adjusted by means of knob 27 to vary the position of the scale 25 in accordance with the runway length, as shown on scale 28, in which scale the figures shown are in hundreds of feet, that is, 40 means 4000 ft.; 50 means 5000 ft., etc., up to 120 which means 12,000 ft.

It will be seen that by turning the knob 27 the gear 29 will move the scale 25 through the meshing of the gear sector 30 on the periphery of the scale which meshes with gear 29, whereby the scale is positioned according to runway length.

The knob 31 is adapted to be adjusted according to the wind velocity and is graduated according to such velocity, and the setting of this knob effects a setting of one of the two hair springs 32 in the meter, which is of the D'Arsonval moving coil type having contra-directional hair springs connected at their outer ends to the adjustment member 31 and link 33 which is pivotally mounted at 34 and is actuated by expansion and contraction of the aneroid 35, which automatically moves the hair spring 32 to thereby position the pointer 26 in accordance with the changes in air density of pressure altitude.

The wind setting knob 31 is shown as a push-pull control connected to the outer end of the remaining hair spring 32, and provides means whereby the pointer 26 may be manually moved in accordance with the wind velocity along the runway at the time of take-off. Knob 31 may optionally be of the rotary type shown in FIG. 4 in which case appropriate linkage such as a rack and pinion may be employed, whereby rotation of control knob 31 causes movement of the air spring 32 in a substantially tangential manner or direction. The wind setting member or knob 31 would, in any case, be provided with a suitable scale or calibration to enable the proper positioning of pointer 26 according to the wind velocity encountered at the time of take-off.

Figure 4:
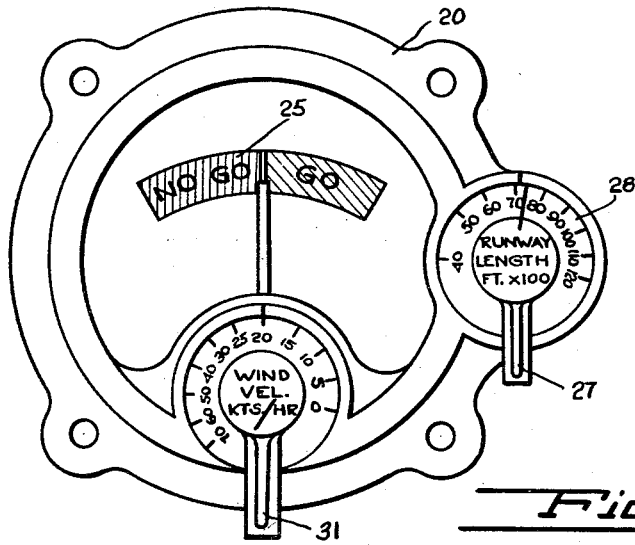
FIG. 4 is a plan view of one form of indicator which may be employed in the invention.

The output meter 20 in FIG. 4 would be applicable in the form shown to a variety of circuit forms which produce as an output a voltage varying as a function of the acceleration rate of the aircraft. Such signals are obtainable from linear ballistic accelerometers or other types, as well as by differentiating a velocity signal. The form of meter shown in FIG. 4 is intended to be substantially the same as that shown in schematic form in FIG. 1, the internally mounted aneroid unit not being shown.

Figure 3:
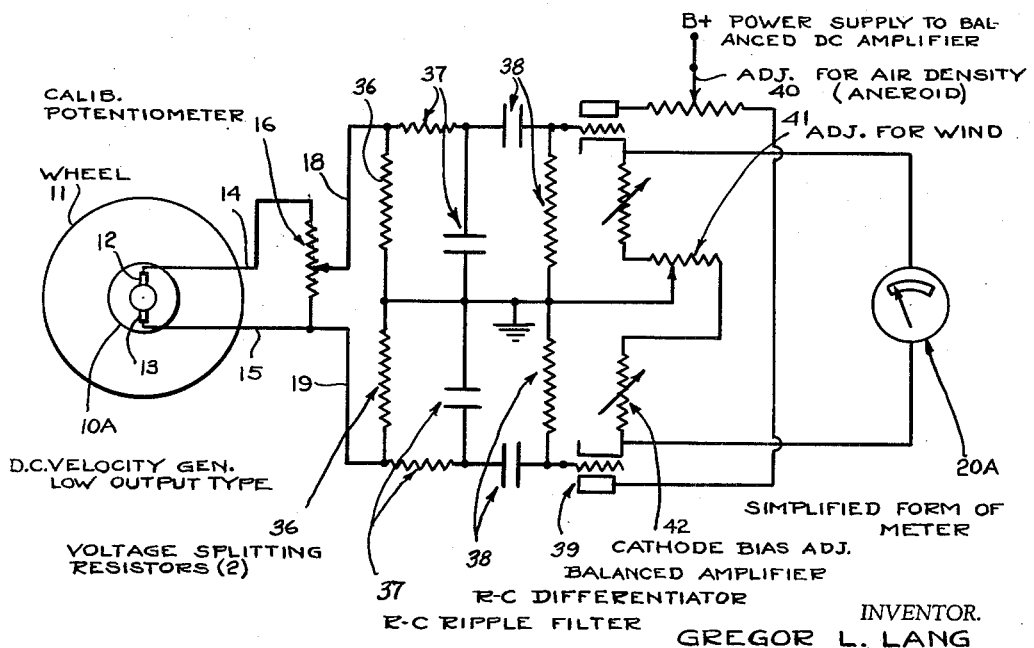
FIG. 3 is a diagrammatic view showing another form of the invention.
Figure 5:
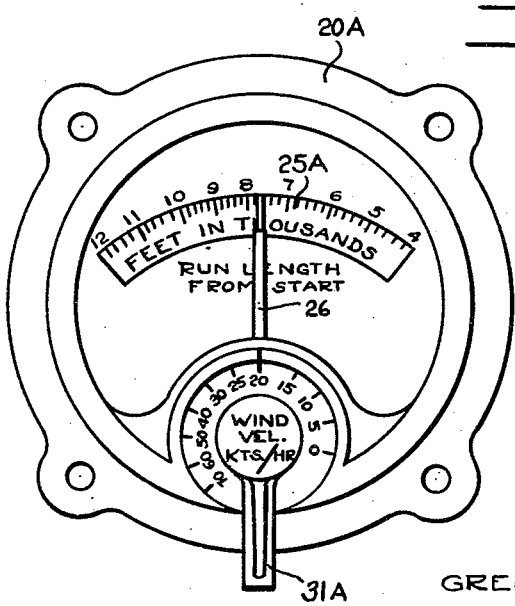
FIG. 5 is a view similar to FIG. 4, but showing another form of indicator.

The simplified form of output meter 20A, FIG. 5, utilizes a stationary scale 25A calibrated in terms of runway length required for take-off. The aneroid adjustment for pressure altitude 35 and wind velocity adjustment 31A may be constructed in a manner similar to the meter of FIG. 4, or may be eliminated from the meter case entirely and applied as amplifier unbalance adjustments as shown in FIG. 3, 40 and 41. The indication of runway length required provided by the meter form of FIG. 4, would be of significance only at the start of the take-off roll, or within perhaps the first few hundred feet.

Any of the systems or circuits disclosed herein may be used as braking "decelerometers" by the use of a polarity reversing switch arranged to connect the meter to the circuit in the opposite sense, or reversed polarity. In such use the instrument would indicate highest reading when maximum braking effectiveness is being achieved.

Figure 6:
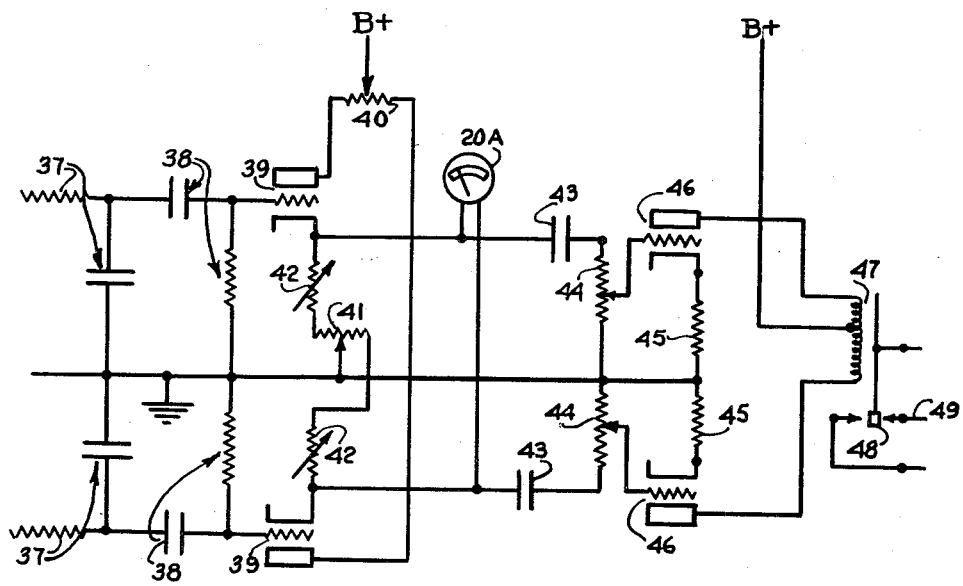
FIG. 6 is a diagrammatic view of a circuit similar to FIG. 3 showing the addition of an acceleration change censor to provide warning of a sudden or abnormal drop-off of acceleration.

The auxiliary alarm circuit shown in FIG. 6 is connected to an acceleration circuit generally similar to that of FIG. 3. The acceleration unbalance voltage appearing at the cathodes of amplifier tubes 39 is differentiated once more by the action of the capacitors 43, and resistors 44, which are shown as potentiometers to permit adjustment of the sensitivity of amplifier tubes 46. Amplifier tubes 46 obtain grid bias from cathode resistors 45, with the resulting balance plate current passing through the split winding of a balanced armature or differential current relay 47. The relay contacts 48 are connected through leads 49 to any desired alarm or warning indicator such as a horn, red light or other device.

The function of this second differentiator and amplifier circuit is such that as long as the acceleration signal appearing at the cathodes of tubes 39 is relatively constant or is decreasing slowly at a normal rate, the second differentiator 43–44 does not supply sufficient signal to the grids of tubes 46 to actuate relay 47. When, however, any abnormal condition arises to cause an abrupt drop in the acceleration voltage, amplifier tubes 46 will be sufficiently unbalanced to cause relay 47 to be actuated, thus actuating the auxiliary alarm means and thereby calling attention to the abrupt reduction of acceleration.

In a commercial form of this invention it will probably be found desirable to incorporate some form of flap position indication to preclude the possibility of starting the take-off roll with the wing flaps set in an incorrect position for take-off. This could take the form of position or limit switches of standard type, so connected as to disable or break the accelerometer circuit except when the flaps are extended to the proper take-off position. Further interlocks might also be provided; for instance, a throttle position interlock whereby throttle positions of half-power or less will close switch 24, thus automatically converting the instrument into a velocity meter or ground speedometer, in the manner described elsewhere.

In FIG. 5 is shown a form of meter 20A in which the runway length adjustment 27 and scale 28 is eliminated and the pointer 26 indicates on the scale or dial 25A the runway length necessary for the aircraft to become safely airborne. This form eliminates the necessity of the runway length setting and simplifies the construction of the apparatus.

In the form of the apparatus shown in FIG. 3 the velocity generator 10A is preferably of the low output type connected to the calibrating potentiometer 16 by the leads 14 and 15 and the leads 18 and 19 are connected to the meter 20A which is of simplified form through the voltage splitting resistors 36 and R-C ripple filters 37 to the R-C differentiators 38 to the balanced D.C. amplifier 39.

The acceleration voltage unbalances the grids of the tubes causing the plate currents to be unbalanced, one increasing and the other decreasing, and the resulting current unbalances are detected at the cathodes by the output instrument or meter.

In this form of apparatus the aneroid or air density adjustment is introduced at 40 to the balance potentiometer connected in the B+ supply to the balanced D.C. amplifier 39 and the adjustment for wind velocity is provided through the balance potentiometer 41 connected in the cathode circuit.

In this form of instrument the manual adjustments for runway length is not required, and the manual adjustments for barometric pressure and wind velocity may alternately be introduced directly into the output meter by means of the hair springs as previously described and as suggested at 31A, FIG. 5.

I claim:

1. In an aircraft, a take-off safety indicating device effective during take-off roll for denoting the ability of the craft to become airborne within the available length of runway comprising, acceleration sensing means for providing a signal varying as a function of the time rate of gain of velocity of the aircraft during take-off roll, means for modifying said signal according to known ambient variables and indicating means responsive to said modified signal for indicating the ability of the craft to become safely airborne.

2. In an aircraft, a take-off safety indicating device effective during take-off roll of the aircraft for denoting the ability of the craft to become safely airborne within the available length of runway comprising, acceleration sensing means operatively associated with a moving part of the aircraft for producing a signal varying as a function of the time rate of gain of velocity of the aircraft, means for modifying said signal according to certain known ambient variables and indicating means responsive to said modified signal for denoting the ability of the craft to become safely airborne according to said modified signal.

3. In an aircraft, a take-off safety indicating device for denoting the ability of a craft to become safely airborne within the available length of runway comprising, acceleration sensing means for deriving a signal as a function of the time rate of gain of velocity of the aircraft, signal modifying means for modifying said signal as a function of wind velocity, second signal modifying means varying said signal as a function of air density, and means for denoting the value of said signal as modified by said modifying means for obtaining an indication of runway length required for the craft to become safely airborne.

4. In an aircraft, a take-off safety indicating device for denoting the ability of an aircraft to become safely airborne within the available length of runway comprising, acceleration sensing means for deriving an acceleration signal as a function of the time rate of change of velocity of the aircraft, means for modifying said signal according to the acceleration rate required for safe take-off, said modified signal being the computed resultant of the environmental variables including runway length, wind velocity and air density and output means responsive to said acceleration signal and to said signal modifying means.

5. In an aircraft, a take-off safety indicating device for denoting the ability of an aircraft to become safely airborne within the available length of runway comprising, acceleration sensing means for deriving an acceleration signal as a function of the time rate of change of velocity of the aircraft, means for modifying said signal according to the acceleration rate required for safe take-off, said signal modifying means being the computed resultant of the environmental variables including runway length, wind velocity and air density and output means responsive to the relative values of said acceleration signal and said signal modifying means.

6. In an aircraft, a take-off safety indicating device for denoting the ability of an aircraft to become safely airborne within the available length of runway comprising, acceleration sensing means for deriving an acceleration signal as a function of the time rate of change of velocity of the aircraft, modifying means for modifying said signal and representing the acceleration rate required for safe take-off, said signal modifying means being the computed resultant of the environmental variables including runway length, wind velocity and air density and output means for denoting value of said acceleration signal as modified by said modifying means.

7. In an indicating system for denoting the ability of an aircraft to become safely airborne, means for deriving an acceleration rate signal, means for combining a plurality of environmental condition signals with said acceleration rate signal, said environmental condition signals representing derivation of wind velocity, runway length and air density, and output indicating means responsive to the combined resultant of said acceleration rate signal and said environmental condition signals.

8. In an indicating system for denoting the ability of an aircraft to become safely airborne, means for deriving an acceleration rate signal, means for combining a plurality of environmental condition signals with said acceleration rate signal, said environmental condition signals representing derivations of wind velocity, runway length and air density, said combining means including electronic mixing means for combining said environmental condition signals, and indicating means responsive to the combined resultant of said acceleration rate signal and to said environmental condition signals.

9. In an indicating system for denoting the ability of an aircraft to become safely airborne, means for deriving an acceleration rate signal, means for modifying said signal according to a plurality of environmental conditions, said modifying means representing derivation of wind velocity, runway length and air density, and indicating means responsive to said acceleration rate signal and to said environmental condition signal modifying means.

10. In an aircraft, a take-off safety indicating device effective during take-off roll for denoting the ability of the craft to become airborne within the available length of runway comprising, acceleration sensing means for providing a signal varying as a function of the time rate of change of velocity, indicating means responsive to said acceleration sensing means and means for indicating by said indicating means the ability of the craft to become safely airborne and means for varying the responsiveness of the indicating means to the acceleration signal.

11. In an aircraft, a take-off safety indicating device effective during take-off roll for denoting the ability of the craft to become airborne within the available length of runway comprising, acceleration sensing means for providing a signal varying as a function of the time rate of change of velocity, indicating means responsive to said acceleration sensing means and means for indicating by said indicating means the ability of the craft to become safely airborne and differentiator means for detecting and denoting loss of acceleration rate.

12. In an aircraft, a take-off safety indicating device effective during take-off roll for denoting the ability of the craft to become airborne within the available length of runway comprising, acceleration sensing means for providing a signal varying as a function of the time rate of change of velocity, indicating means responsive to said acceleration sensing means and means for indicating by said indicating means the ability of the craft to become safely airborne, differentiator means for detecting loss of acceleration rate and alarm means for indicating to the pilot such loss.

13. In an aircraft, a take-off safety indicating device effective during take-off roll for denoting the ability of the craft to become airborne within the available length of runway comprising, acceleration sensing means for providing a signal varying as a function of the time rate of change of velocity, indicating means responsive to said acceleration sensing means and means for indicating by said indicating means the ability of the craft to become safely airborne and means for varying the circuitry of said device to make it responsive to velocity only.

14. In an aircraft, a take-off safety indicating device effective during take-off roll for denoting the ability of the craft to become airborne within the available length of runway comprising, acceleration sensing means for providing a signal varying as a function of the time rate of change of velocity, indicating means responsive to said acceleration sensing means and means for indicating by said indicating means the ability of the craft to become safely airborne and switch means for rendering said apparatus responsive to velocity.

References Cited by the Examiner

UNITED STATES PATENTS

| Re. 27,704 | 12/45 | Moseley | 340—27 |
| 2,408,711 | 10/46 | Volz | 340—262 |
| 2,532,158 | 11/50 | Ewing | 318—32 |
| 2,613,071 | 10/52 | Hansel | 73—178 XR |
| 2,665,860 | 1/54 | Bancroft | 340—27 |
| 2,701,111 | 2/55 | Schuck | 318—489 X |
| 2,736,878 | 2/56 | Boyle | 340—27 |
| 2,933,268 | 4/60 | Jude | 244—76.9 |
| 3,034,096 | 5/62 | Craddock | 340—27 |

OTHER REFERENCES

Snodgrass, "Take-Off Aids to Pilots," published in Skyways, October 1957, pages 24 and 89–91.

NEIL C. READ, *Primary Examiner.*

EVERETT R. REYNOLDS, BENNETT G. MILLER, THOMAS B. HABECKER, *Examiners.*